(12) United States Patent
Godfrey (10) Patent No.: US 10,362,000 B2
(45) Date of Patent: Jul. 23, 2019

(54) VIRTUAL WI-FI NETWORK AND SECURE TUNNEL PROVISIONING FOR RELIABLE, PERSISTENT CONNECTION OF ENERGY DEVICES AT THE CUSTOMER'S PREMISES

(71) Applicant: ELECTRIC POWER RESEARCH INSTITUTE, INC., Charlotte, NC (US)

(72) Inventor: Timothy Godfrey, Overland Park, KS (US)

(73) Assignee: Electric Power Research Institute, Inc., Charlotte, NC (US)

( * ) Notice: Subject to any disclaimer, the term of this patent is extended or adjusted under 35 U.S.C. 154(b) by 145 days.

(21) Appl. No.: 15/381,265

(22) Filed: Dec. 16, 2016

(65) Prior Publication Data

US 2017/0208039 A1    Jul. 20, 2017

Related U.S. Application Data

(60) Provisional application No. 62/279,030, filed on Jan. 15, 2016.

(51) Int. Cl.
*G06F 9/00* (2006.01)
*H04L 12/46* (2006.01)
(Continued)

(52) U.S. Cl.
CPC ............ *H04L 63/0272* (2013.01); *G06F 9/00* (2013.01); *H04L 12/4633* (2013.01);
(Continued)

(58) Field of Classification Search
CPC ............... H04L 63/0272; H04L 63/029; H04L 12/4633; H04L 12/4641; H04L 67/141;
(Continued)

(56) References Cited

U.S. PATENT DOCUMENTS 9,712,486 B2 * 7/2017 Johnson ................. H04W 4/70
10,165,447 B2 * 12/2018 Raleigh ............ G06Q 10/06375
(Continued)

FOREIGN PATENT DOCUMENTS

WO    2009094423    7/2009
WO    2012092263    7/2012

OTHER PUBLICATIONS

K. Afanasiev, International Search Report and Written Opinion, dated Apr. 12, 2017, Federal Institute of Industrial Property, Moscow, Russia.

*Primary Examiner* — Saleh Najjar
*Assistant Examiner* — Louis C Teng
(74) *Attorney, Agent, or Firm* — Trego, Hines & Ladenheim, PLLC; Brandon Trego; Jonathan Hines (57) ABSTRACT

A method for providing a virtual Wi-Fi network with secure tunnel provisioning is disclosed. The method provides a reliable, persistent connection between wireless communications enabled devices located at a user's premises and a service provider, and includes the steps of using a software code running on a computing device to pass instructions including a remote server address to an Application Programming Interface (API) running on a wireless router connected to the computing device through a Local Area Network (LAN); using the wireless router to establish a secure communication session with the remote server through a Wide Area Network (WAN); receiving at the wireless router through the WAN parameters required to set up a wireless Virtual Local Area Network (VLAN); and using the router, establishing a wireless VLAN at the user's premises and connecting the wireless VLAN to the remote server through the WAN using a secure tunnel connection.

9 Claims, 10 Drawing Sheets

(51) Int. Cl.
*H04L 29/06* (2006.01)
*H04L 29/08* (2006.01)
*H04W 12/08* (2009.01)
*H04W 76/11* (2018.01)
*H04W 76/12* (2018.01)
*H04W 84/12* (2009.01)

(52) U.S. Cl.
CPC ........ *H04L 12/4641* (2013.01); *H04L 63/029* (2013.01); *H04L 67/141* (2013.01); *H04W 12/08* (2013.01); *H04W 76/11* (2018.02); *H04W 76/12* (2018.02); *H04W 84/12* (2013.01)

(58) Field of Classification Search
CPC ..... H04W 76/12; H04W 76/11; H04W 12/08; H04W 84/12; G06F 9/00
See application file for complete search history.

(56) References Cited

U.S. PATENT DOCUMENTS

| | | | |
|---|---|---|---|
| 2005/0117537 A1 | 6/2005 | Okabe | |
| 2012/0131324 A1* | 5/2012 | Ansari | H04Q 9/00 713/100 |
| 2013/0091258 A1* | 4/2013 | Shaffer | H02J 3/00 709/221 |
| 2015/0058930 A1* | 2/2015 | Mitchell | G06F 21/41 726/3 |
| 2015/0097697 A1* | 4/2015 | Laval | H04L 69/03 340/870.02 |
| 2015/0188949 A1* | 7/2015 | Mahaffey | H04L 63/20 726/1 |
| 2015/0333965 A1* | 11/2015 | Lee | H04L 45/02 370/254 |

\* cited by examiner

VIRTUAL WI-FI NETWORK AND SECURE TUNNEL PROVISIONING FOR RELIABLE, PERSISTENT CONNECTION OF ENERGY DEVICES AT THE CUSTOMER'S PREMISES

BACKGROUND OF THE INVENTION

This invention relates generally to a virtual Wi-Fi network with secure tunnel provisioning, and more particularly to a method for providing a virtual Wi-Fi network that provides reliable, persistent connection of energy devices at a customer's premises.

Figure 1:
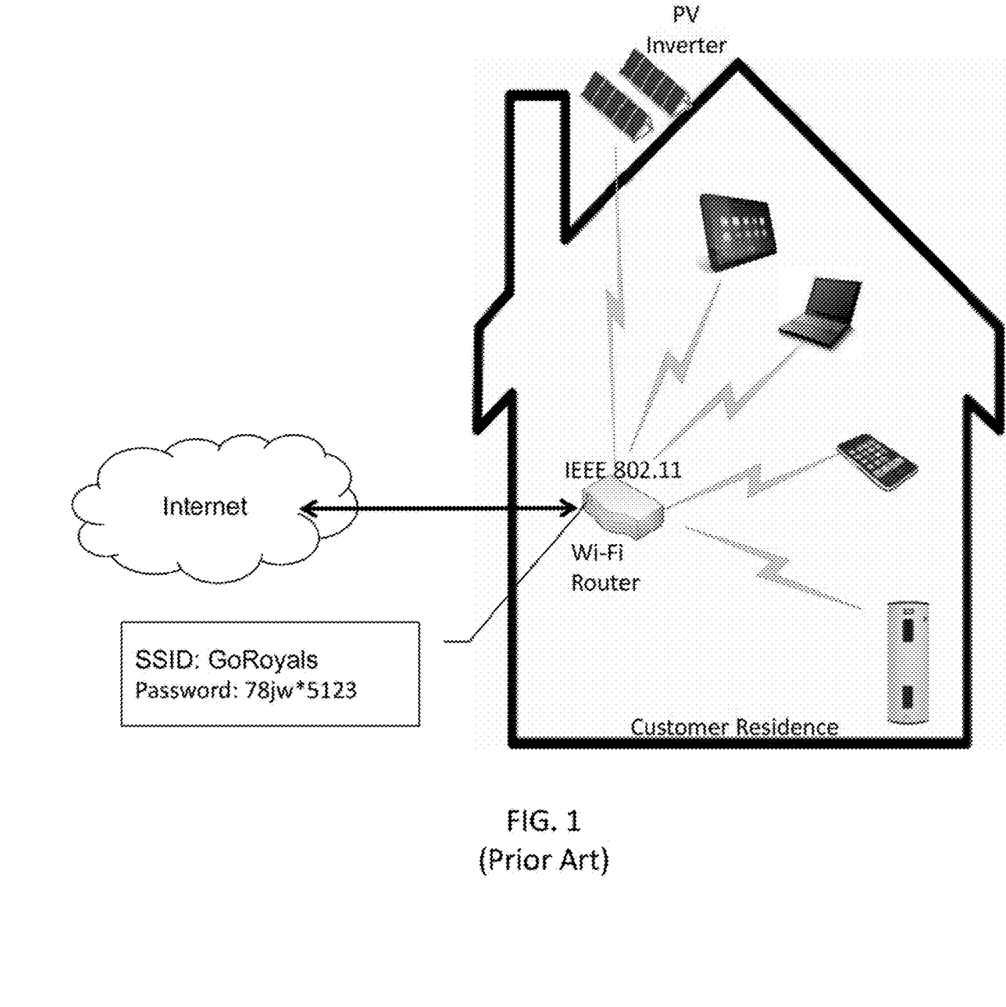
FIG. 1 shows a typical Wi-Fi setup being utilized for both energy and Internet of Things.

Many aspects of the electric utility Smart Grid and Integrated Grid rely on communications to devices at a customer's premises. These devices could be load control switches, displays, EV charging, PV generation, or storage. First-generation systems were based on a Home Area Network (HAN) with connectivity provided through the meter. These systems have not been successful for a number of reasons, such as limited range and customer interaction required for provisioning. For the second generation of devices, the ubiquitous presence of Wi-Fi in a customer's premises is being utilized for both energy and smart home and/or Internet of Things (IoT) applications. See FIG. 1.

Figure 2:
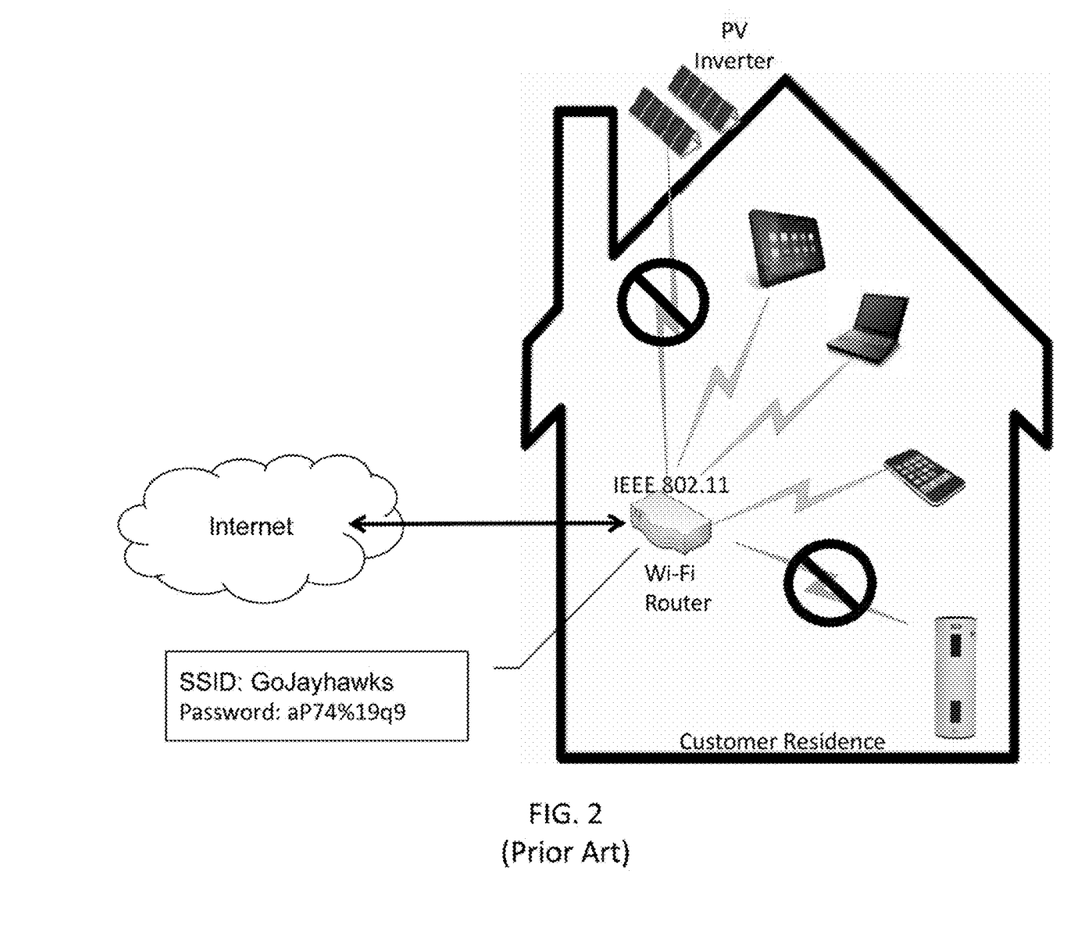
FIG. 2 shows a status of the Wi-Fi setup of FIG. 1 after a customer changes an SSID and/or password.

One problem is that Wi-Fi network parameters (Service Set Identifier (SSID) and security key) are frequently changed by the customer, and when making changes, the remote controlling device may be forgotten or the customer has forgotten how to update the device's settings, see FIG. 2, resulting in a lost connection between a WI-FI enabled device and the network. Research has shown that load control devices connected to a customer's Wi-Fi network have a high attrition rate over a period of time. Another problem is the fracturing of the market through a proliferation of proprietary cloud services. A virtual network based on open standards assists in avoiding proprietary lock-in of service providers connecting to devices at the customer's premises. A third problem is the vulnerability of IoT and Internet-connected devices to compromises by attackers that turn them into "bots" to generate Distributed Denial of Service attacks. Isolating such devices from the public Internet can prevent both the compromise and the attack vector.

Accordingly, there is a need for a Wi-Fi connection for energy devices at a customer's premises that offers easy provisioning and setup and provides a permanent, secure connection to the utility services they are associated with.

BRIEF SUMMARY OF THE INVENTION

This need is addressed by the present invention, which provides a virtual Wi-Fi network that enables a non-technical user to establish a connection of an energy device over their Wi-Fi and Internet connection that is a reliable, persistent connection from the device to the utility over the Internet; which is independent of the customer's home Wi-Fi network settings; and a provides a secure connection path to the utility that cannot be hijacked or carry undesired data.

According to one aspect of the invention, a method of providing a reliable, persistent connection between wireless communications enabled devices located at a user's premises and a service provider includes the steps of using a software code running on a computing device to pass instructions including a remote server address to an Application Programming Interface (API) running on a wireless router connected to the computing device through a Local Area Network (LAN); using the wireless router to establish a secure communication session with the remote server through a Wide Area Network (WAN); receiving at the wireless router through the WAN parameters required to set up a wireless Virtual Local Area Network (VLAN); and using the router, establishing a wireless VLAN at the user's premises and connecting the wireless VLAN to the remote server through the WAN using a secure tunnel connection.

According to another aspect of the invention, a method of providing a reliable, persistent connection between wireless communications enabled devices located at a user's premises and a service provider includes the steps of using a computing device connected to a wireless router located on the user's premises to connect to the service provider's website; receiving a software code from the service provider's website and using the software code to pass instructions, including a remote server address, to an API running on a wireless router connected to the computing device through a LAN; using the remote server address to connect the wireless router to the remote server and establish a secure session; activating a single SSID and secure tunnel based on negotiated encryption and keys; and using the router, establishing a wireless VLAN at the user's premises and connecting the wireless VLAN to the remote server through the WAN using the secure tunnel connection.

BRIEF DESCRIPTION OF THE DRAWINGS

The invention may be best understood by reference to the following description taken in conjunction with the accompanying drawing figures, in which.

DETAILED DESCRIPTION OF THE INVENTION

Referring to the drawings wherein identical reference numerals denote the same elements throughout the various views, FIGS. 3-6 illustrate a virtual Wi-Fi network with a secure tunneling provision mechanism configured to provide a persistent and secure connection between devices at the customer and the utility services they connect to, using the customer's Internet connection. It should be appreciated that while this discussion is directed to "utility services" and/or providers and energy devices, such as a hot water heater, the current invention may be used to provide a secure connection between any wireless enabled device and any service provider.

Figure 3:
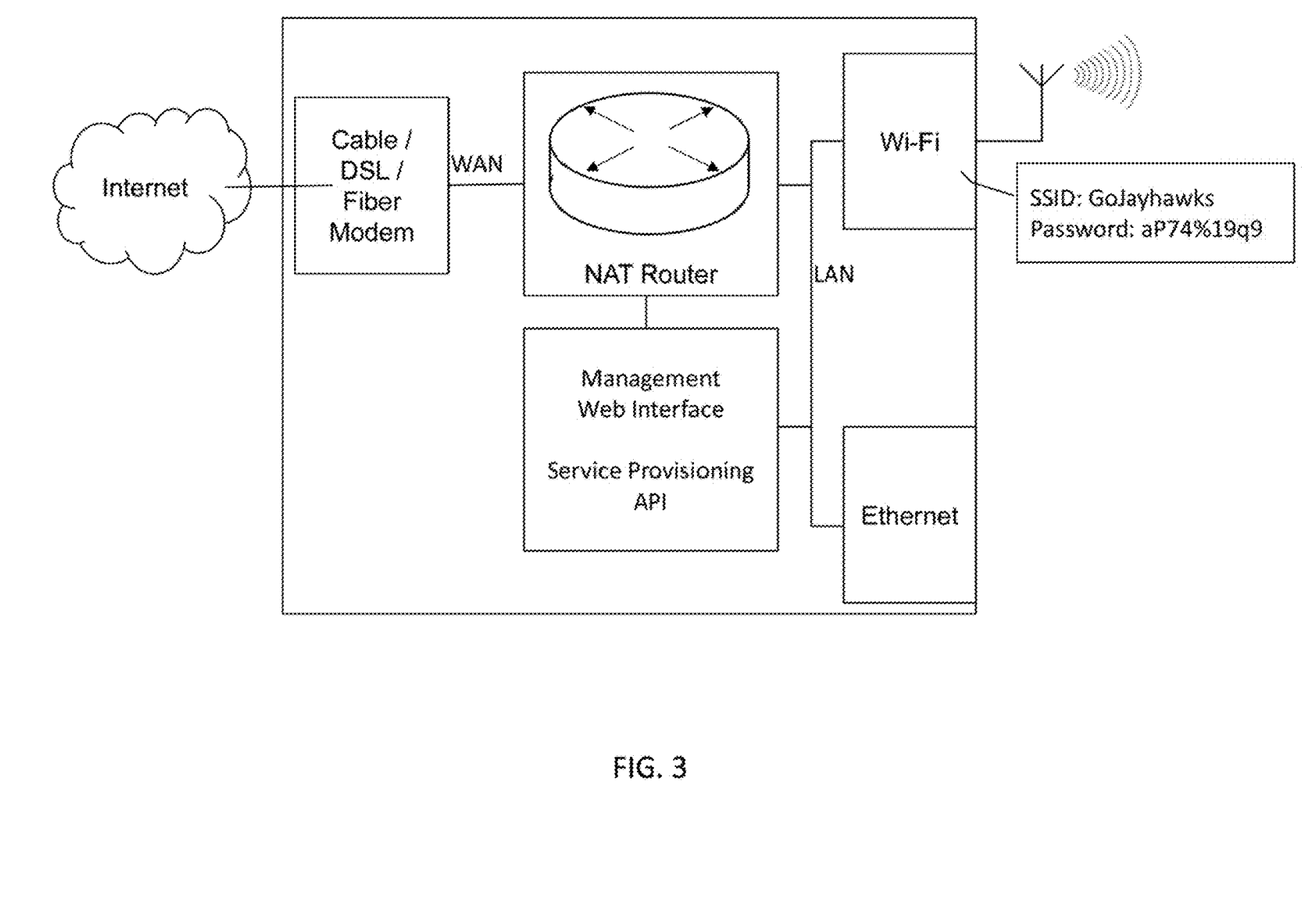
FIG. 3 shows a Wi-Fi router with secure provisioning API.

As shown, a secure provisioning Application Programming Interface (API) is provided in a Wi-Fi router like that shown in FIG. 3. The API is accessed from a Local Area Network (LAN) side of the router over Wi-Fi and/or Ethernet to enable a Virtual Service Set Identifier (SSID) and provision a tunnel to a host utility, see FIG. 4. A password is not required once a secure connection to the host utility is established due to the SSID being isolated. The tunnel would support both Internet Protocol version six and four (IPv6 and IPv4) networking, as well as, ancillary services such as Dynamic Host Configuration Protocol version six (DHCPv6) and any other suitable services. The Virtual SSID would be standardized and designed for use in standard routers through the normal IEEE 802.11 beacon, either visible or invisible. The SSID string itself, or some aspects of the string, would be unique and standardized to allow devices to find the proper network. As an alternative to a standardized SSID, the SSID name can be variable and unique. In this case other discovery mechanisms such as IEEE 802.11 beacon elements, 802.11u Generic Advertisement Service (GAS), and/or discovery and signaling mechanisms defined in 802.11ai Fast Initial Link Setup (FILS) could be used by the device to identify the energy or IoT network. Furthermore, multiple SSIDs may be created and provisioned differently for different service providers.

Figure 4:
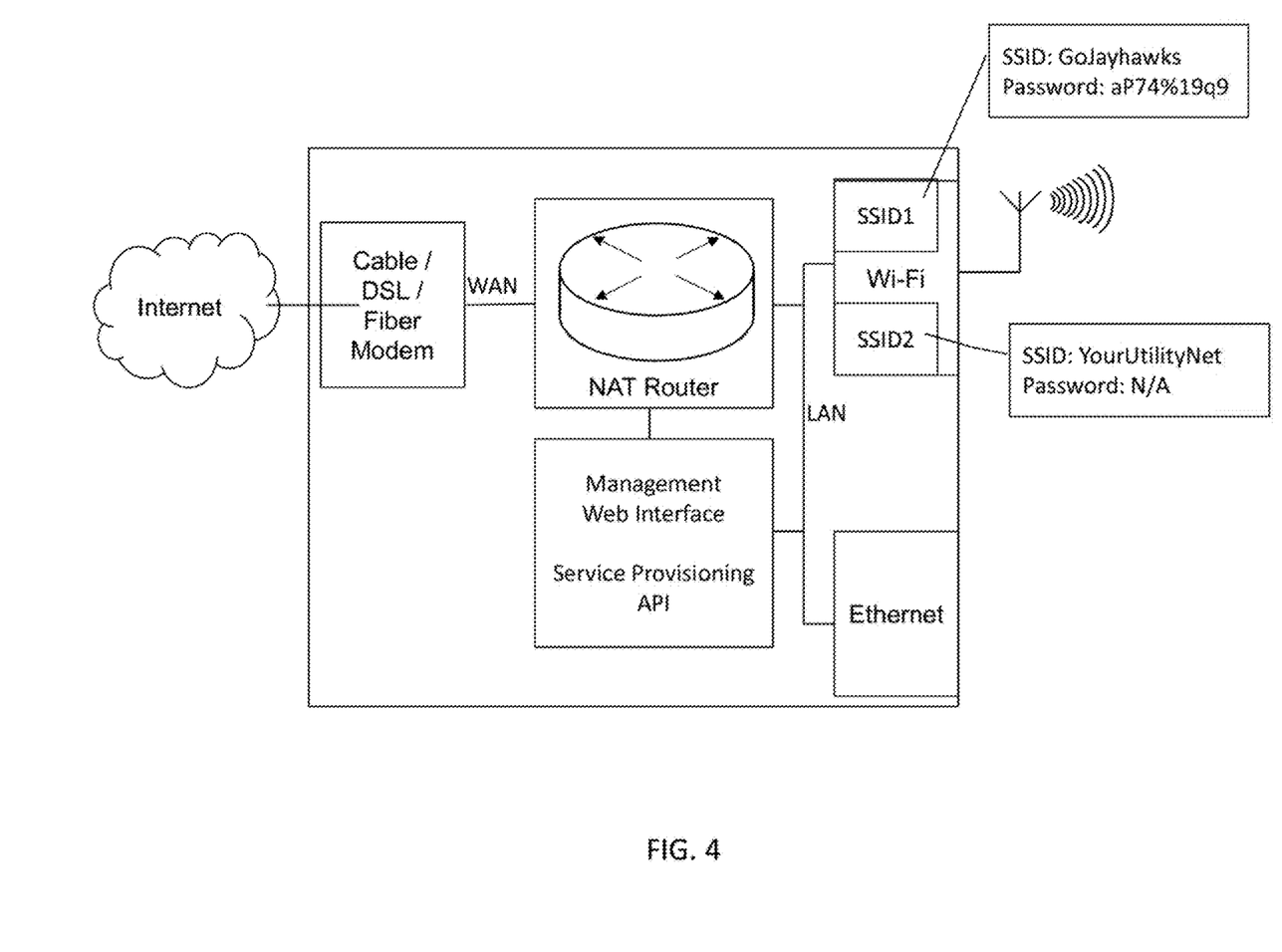
FIG. 4 shows the router of FIG. 3 with a virtual SSID established.
Figure 5:
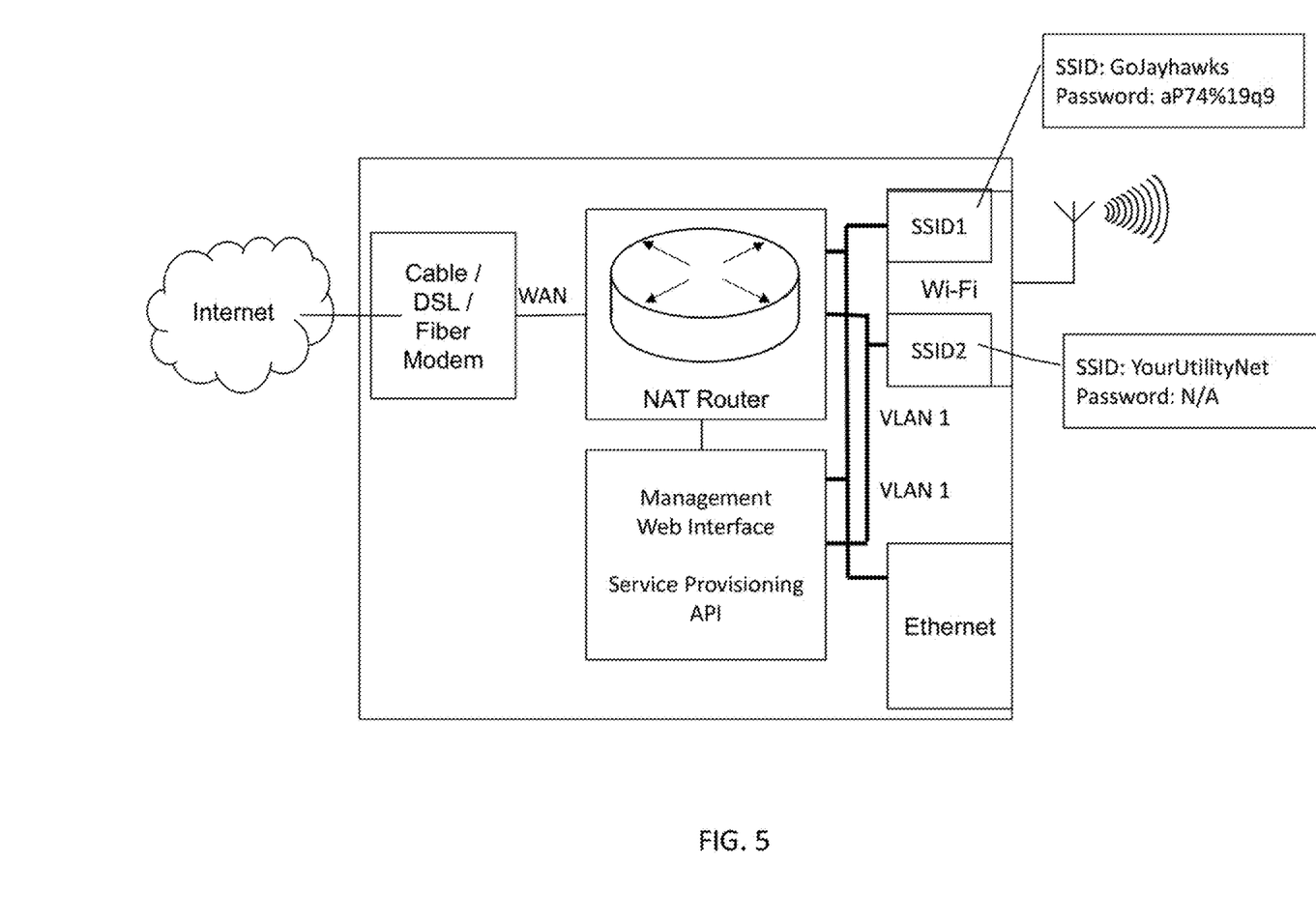
FIG. 5 shows the router of FIG. 3 with a VLAN established.
Figure 6:
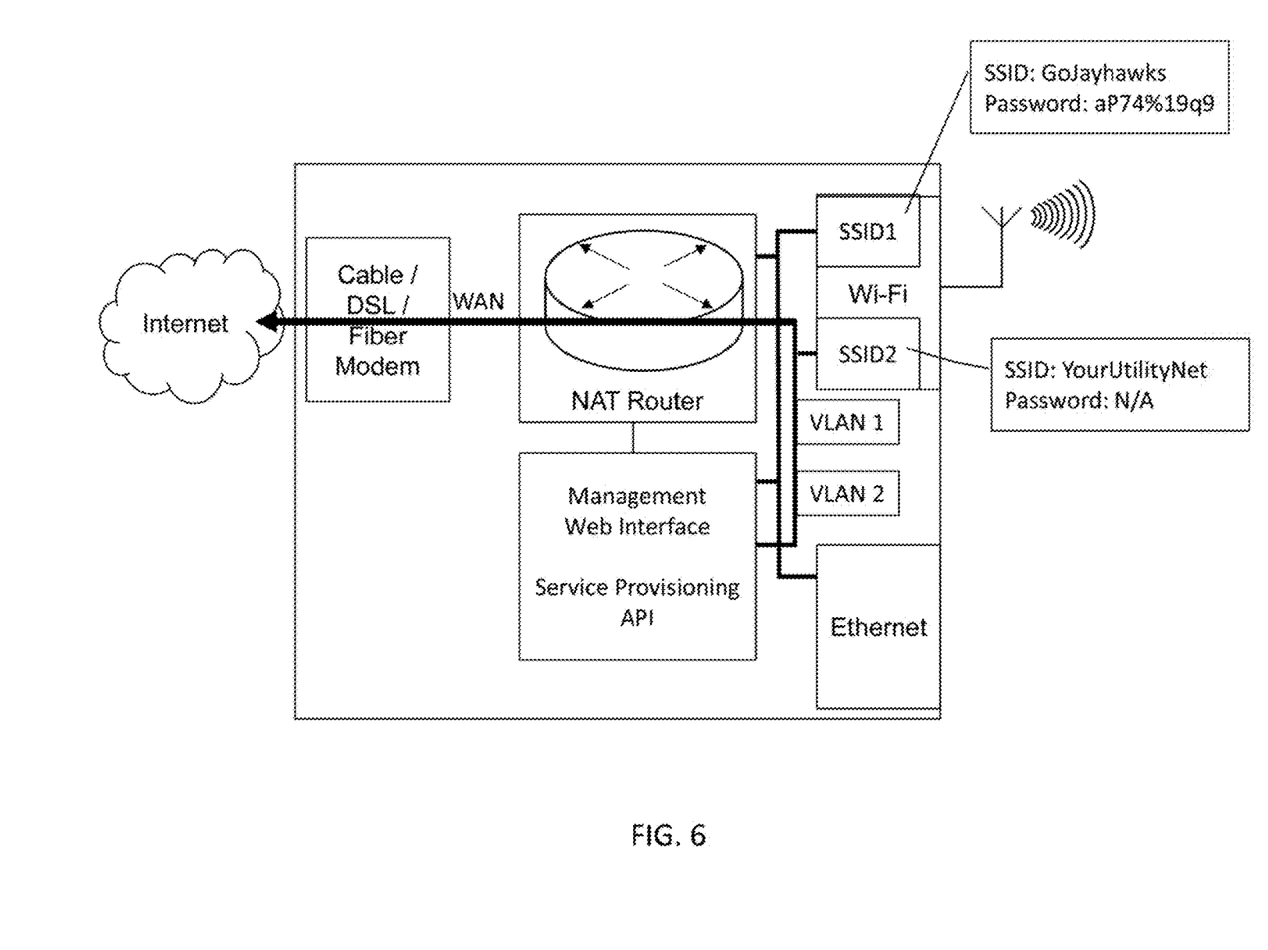
FIG. 6 shows the router of FIG. 3 with a VPN established.
Figure 7:
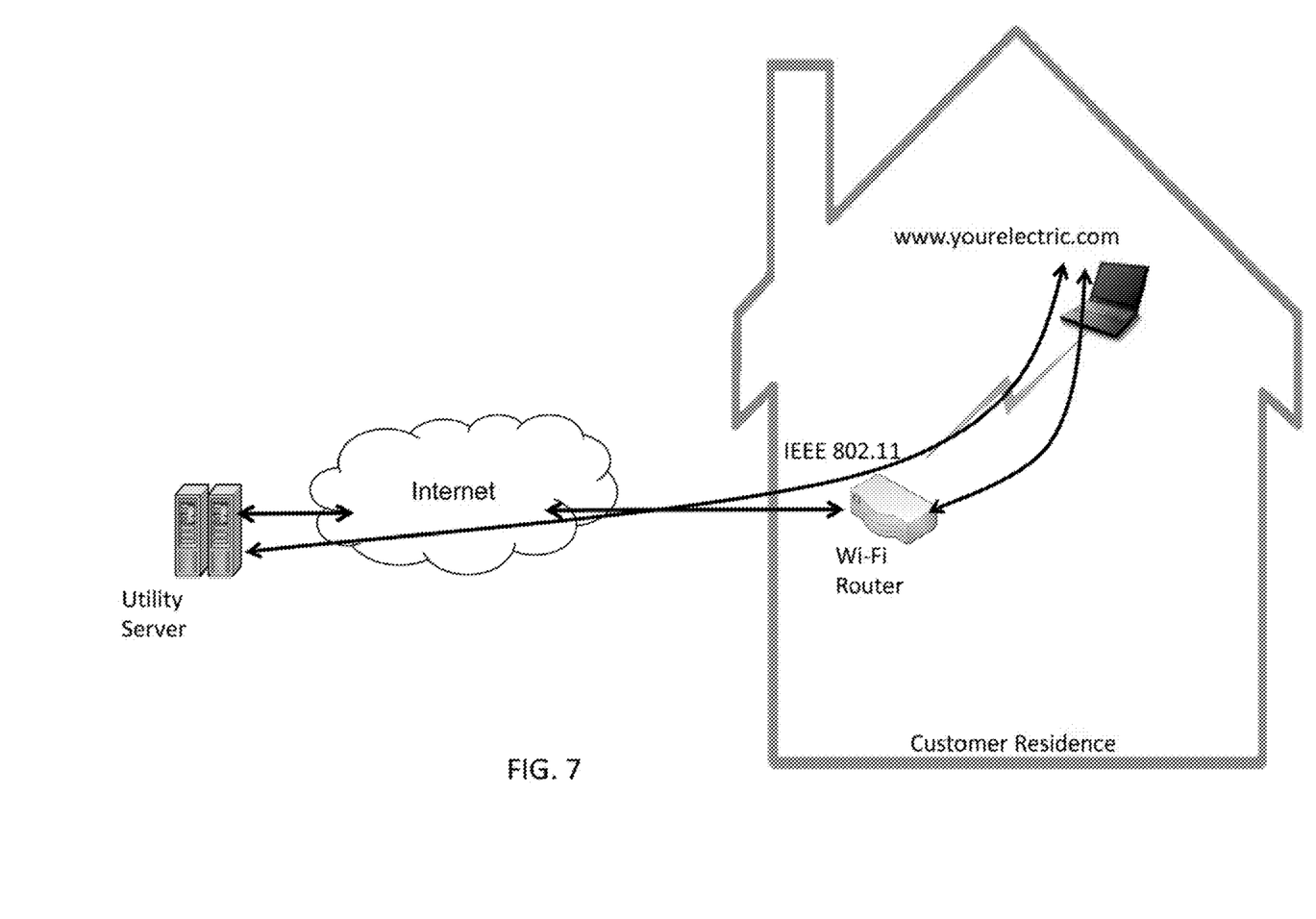
FIGS. 7-10 show a method of connecting the router of FIG. 3 to a utility's server.
Figure 8:
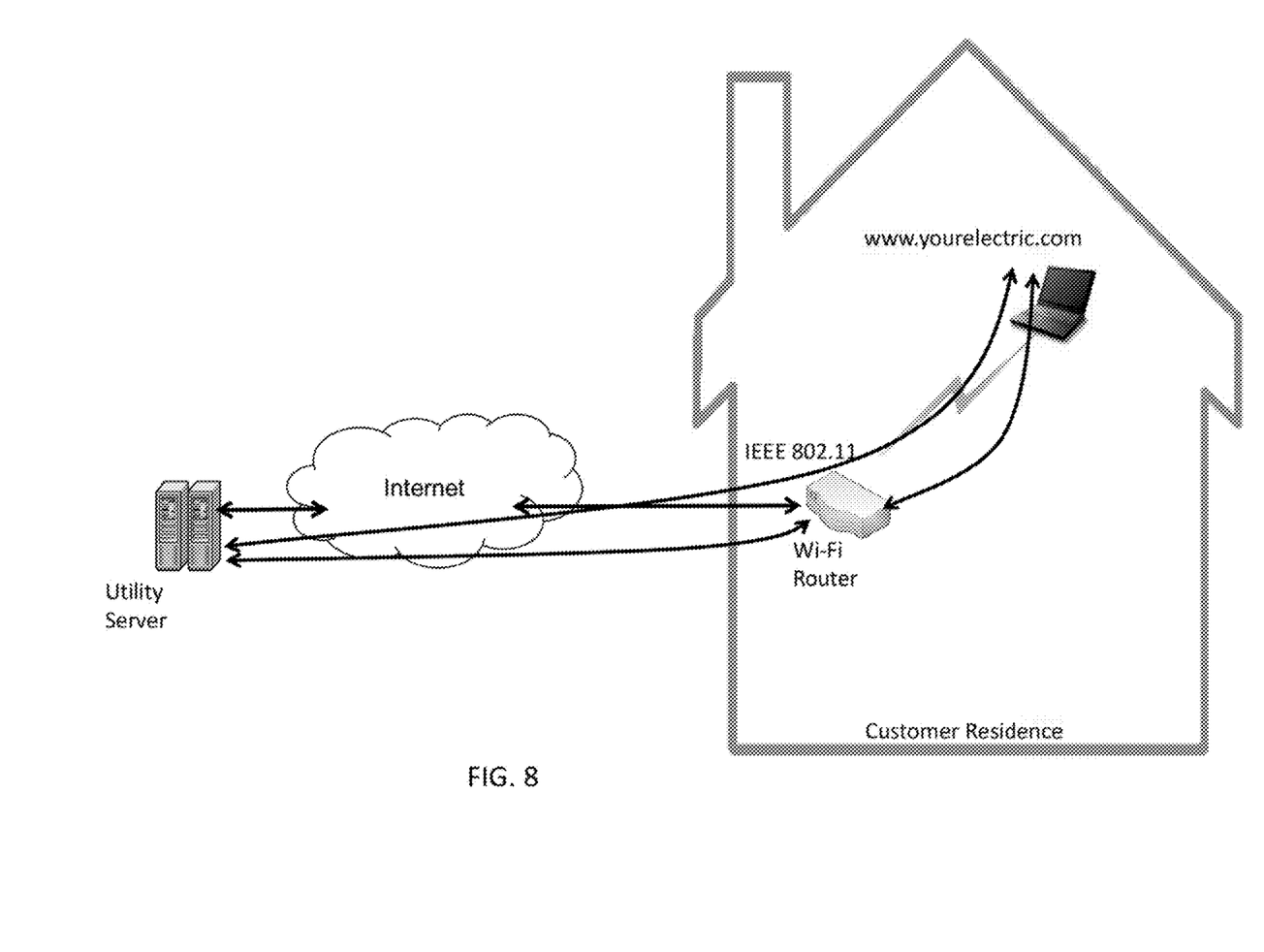
Figure 9:
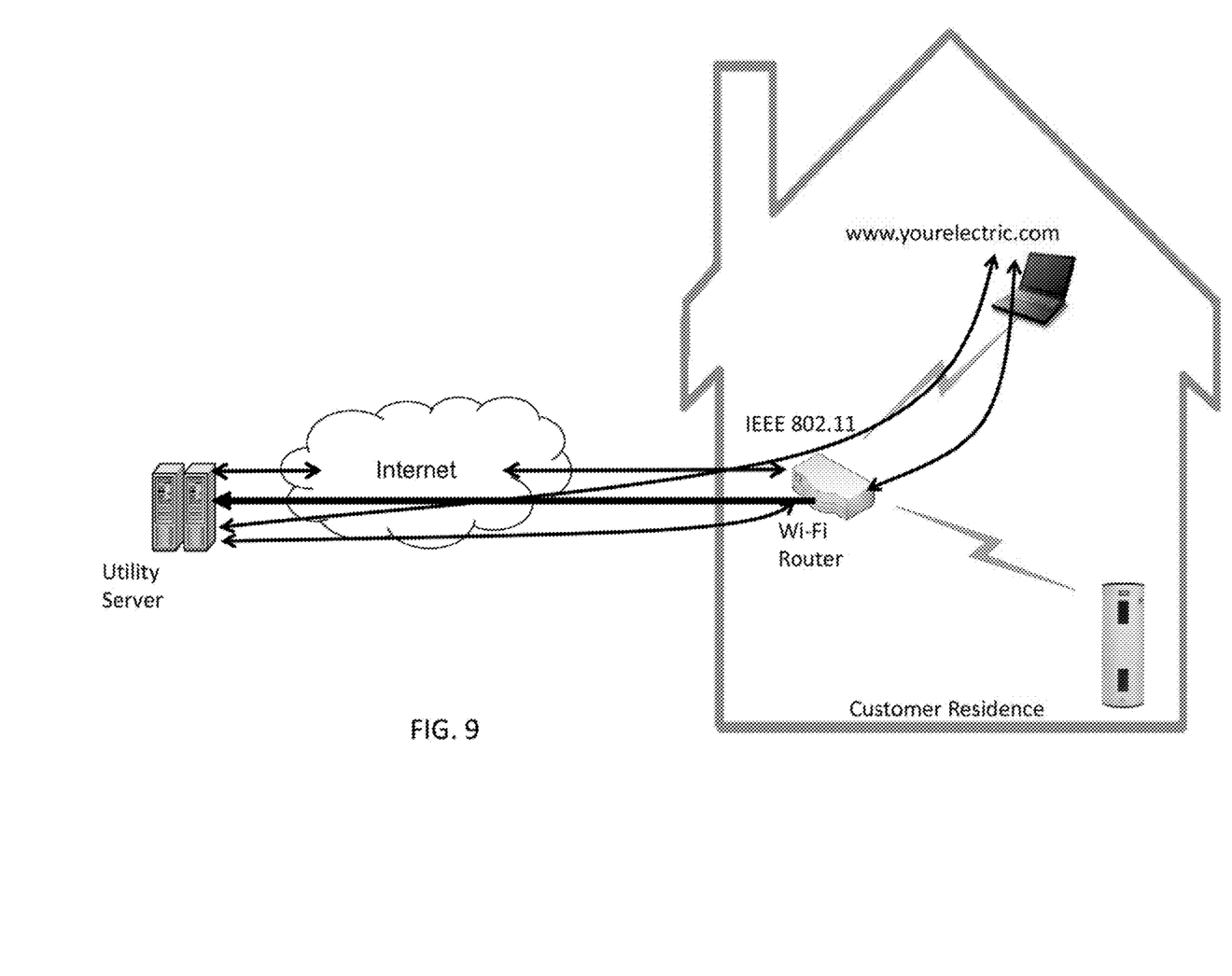
Figure 10:
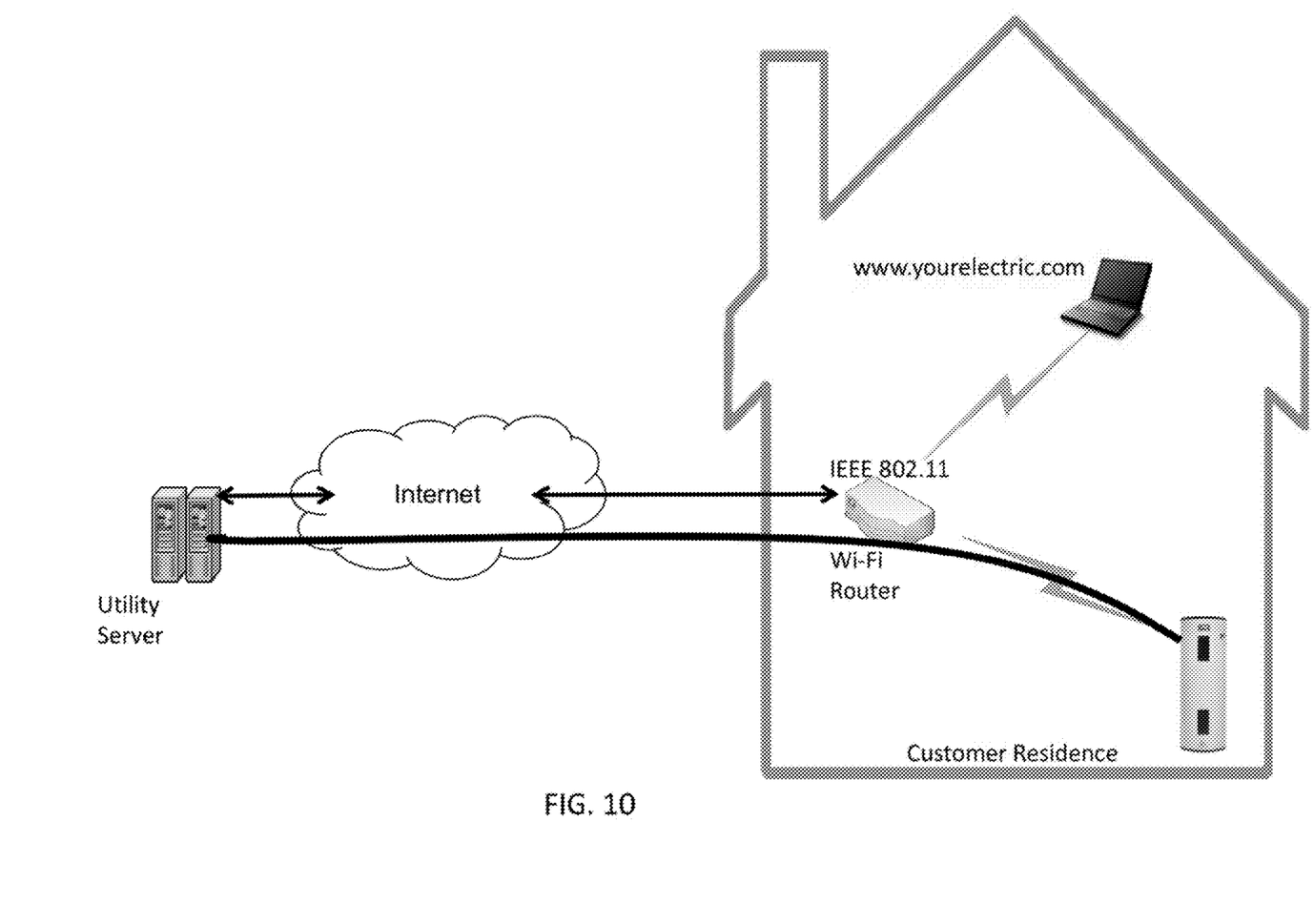

The provisioning process enables an additional Virtual SSID on the 802.11 network, FIG. 4, and configures and enables a secure tunnel to a utility or service provider's gateway. The provisioning also establishes a private Virtual Local Area Network (VLAN), FIG. 5, between the Virtual SSID network and the secure tunnel. The VLAN isolates SSID2 from SSID1 so that traffic on the customer's Wi-Fi network is isolated from the virtual tunnel network. A site-to site Virtual Private Network (VPN) from Virtual LAN (VLAN) to server network application layer gateway may also be used in the router for additional security. See FIG. 6. Optionally, the provisioning can establish a firewall functionality and/or an application layer gateway on the virtual tunneled network, depending on the service provider's requirements.

A script and/or software for secure provisioning, which runs in the customer's browser and/or mobile app, accesses the customer's router via the provisioning API (known to be available at the gateway IP address). The customer does not require any knowledge of their Wi-Fi router and is only responsible for authenticating to a utilities website and giving permission and details of the device they are enrolling. Alternatively, the use of standardized service discovery protocols such as Dynamic Service Discovery (DNS-SD), Universal Plug and Play Simple Service Discovery Protocol (UPnP SSDP) for service discovery of the API at the customer router may be used.

A unique secure three-way handshake and authentication between the browser provisioning code, the router provisioning service, and the utility services is provided. The handshake occurs between the utility server, the customer's browser, and the customer's router. The provisioning script in the browser authenticates with the utility server and the virtual tunnel API in the router, while the router simultaneously authenticates with the utility. This handshake ensures the connection and VLAN are not hijacked or spoofed. Only after successful authentication and handshake is the VLAN's SSID enabled on the Wi-Fi interface.

A mechanism for identifying the specific device to be connected and provisioned so the device will not inadvertently connect to a neighbor's router is provided. The device identification can be provided by the utility/service provider, by the user through the browser interface, or by initiating a special, time-limited 'connecting mode' from the device itself. A mechanism for devices to seek and associate to the correct router during provisioning may also be provided. In the case where a device is in range of more than one router broadcasting the virtual SSID, the device associates to the router with the strongest signal. If the device does not find the expected provisioned service on that router (by exchanging and confirming credentials with the provisioning code in the browser), it will disassociate and associate to the next strongest SSID (after a time-out).

The secure tunneling mechanism limits connectivity from the VLAN to exclusively connect to the utility service via the router's Wide Area Network (WAN) port and/or over the Internet. The Virtual SSID is established as an internal VLAN to the network of the tunnel. The tunnel may terminate at an application-layer gateway, firewall, and/or other mechanisms to prevent misuse of the connection. The tunnel does not enable a path to the public Internet, but limits the connection to the specific service it was provisioned for. Furthermore, an optional interconnection between the customer local network and a specific device may be enabled for certain situations (such as an IoT device that provides data to a computer on the local LAN). This path is non routable, and does not grant the device access to the Internet. The availability of this path is subject to the provisioning profile provided by the utility/service provider.

The secured, persistent storage of the Virtual SSID and tunnel provisioning in the router is maintained and remains configured even if the user changes the SSID or password for their home Wi-Fi LAN. If the customer buys a new router, the services would need to be re-provisioned. In the event the customer loses connection, the utility system or service provider may employ a notice mechanism at the end of the tunnel to notify the customer by email that the tunnel lost connection without any explicit action (dis-enrollment) by the customer. In the case where the router is replaced, the utility/service provider would be able to detect the lack of connectivity to the device, and contact the customer by email or text. The device would be re-provisioned when the customer follows the link to the utility/service provider website.

A mechanism to transfer the secure tunnel to a backup communication link provided by the utility/service provider for higher reliability is provided. If the customer Internet connection goes down, the backup link can be activated and the secure tunnel routed through the backup network. The unique aspect of this mechanism is that only the services through the tunnel are routed through the backup network. The customer's general purpose Wi-Fi would not be routed through the backup network. This enables lower bandwidth networks such as a utility-operated Advanced Metering Infrastructure (AMI) network, or lower performance commercial cellular or IoT networks to function as backup. This mechanism is limited to router implementations that provide support for an alternate Wide Area Network (WAN). Alternatively, the service provider could offer an Internet backup service to the customer in addition to the secure tunnel. This would entail re-routing the customer Internet access as well as the secure tunnel through the backup network. It is assumed that in this commercial scenario, the backup network would be broadband, such as commercial LTE.

Referring now to FIGS. 7-10, in use, a customer connects to a utility's website and the website asks permission to enable an energy network. A code placed in the customer's browser which accesses the API in the router and provides the router with a utility server's address on the Internet, FIG. 7. The router connects to the utility's server and establishes a secure session, FIG. 8. The service in the router activates SSID, VLAN, and secure tunnel based on negotiated encryption and keys. Once this is done, appliances and other networked energy devices, such as a hot water heater, connect to the Wi-Fi network, FIG. 9. With a connection established between the energy devices and the Wi-Fi network, packets from the energy devices pass through the tunnel to the utility server only, FIG. 10. The connection is independent of customer's Wi-Fi settings and/or credentials. The isolation of the device from the public Internet prevents an attacker from reaching the device to exploit vulnerabilities. Even if the device was manufactured with a built-in trojan, the secure tunnel prevents access to the Internet. The device is unable to contact the attacker, or conduct a Distributed Denial of Service (DDoS) attack on other sites.

The foregoing has described a virtual Wi-Fi network with secure tunnel provisioning. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A method of providing a reliable, persistent connection between wireless communications enabled devices located at a user's premises and a service provider, comprising the steps of:
    (a) connecting to the service provider's website to obtain a software code, wherein upon connection to the service provider's website, the service provider's website asks permission to enable a network;
    (b) using the software code on a computing device to pass instructions including a remote server address to an Application Programming Interface (API) running on a wireless router connected to the computing device through a Local Area Network (LAN);
    (c) using the wireless router to establish a secure communication session with the remote server through a Wide Area Network (WAN);
    (d) receiving at the wireless router through the WAN parameters required to set up a wireless Virtual Local Area Network (VLAN); and
    (e) using the router, establishing a wireless VLAN at the user's premises and connecting the wireless VLAN to the remote server through the WAN using a secure tunnel connection.

2. The method according to claim 1, wherein the secure tunnel connection is independent of the user's wireless router settings used at the user's premises.

3. The method according to claim 1, wherein the WAN is an internet connection.

4. A method of providing a reliable, persistent connection between wireless communications enabled devices located at a user's premises and a service provider, comprising the steps of:
    (a) using a computing device connected to a wireless router located on the user's premises to connect to the service provider's website;
    (b) receiving a software code from the service provider's website and using the software code to pass instructions, including a remote server address, to an API running on a wireless router connected to the computing device through a LAN, wherein upon connection to the service provider's website, the service provider's website asks permission to enable a network;
    (c) using the remote server address to connect the wireless router to the remote server and establish a secure session;
    (d) activating a single SSID and secure tunnel based on negotiated encryption and keys; and
    (e) using the router, establishing a wireless VLAN at the user's premises and connecting the wireless VLAN to the remote server through a WAN using the secure tunnel connection.

5. The method according to claim 4, wherein the wireless communications enabled device connects to the wireless network through the single SSID.

6. The method according to claim 4, wherein packets from the wireless communications enabled device pass through the secure tunnel connection to the remote server.

7. The method according to claim 4, wherein the wireless router includes a plurality of SSIDs.

8. The method according to claim 7, wherein the single SSID is isolated from the plurality of SSIDs to prevent a change in wireless parameters and/or credentials of the wireless router from interrupting the secure tunnel connection to the remote server.

9. The method according to claim 4, further including the step of creating a site-to-site VPN from the VLAN to the remote server.

* * * * *